United States Patent
Kudva et al.

(10) Patent No.: US 9,027,815 B2
(45) Date of Patent: May 12, 2015

(54) APPARATUS AND METHOD FOR MAKING GLASS SHEET WITH IMPROVED SHEET STABILITY

(75) Inventors: Gautam Narendra Kudva, Horseheads, NY (US); Liming Wang, Painted Post, NY (US); Wei Xu, Missouri City, TX (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 867 days.

(21) Appl. No.: 12/942,124

(22) Filed: Nov. 9, 2010

(65) Prior Publication Data

US 2012/0048905 A1    Mar. 1, 2012

Related U.S. Application Data

(60) Provisional application No. 61/378,544, filed on Aug. 31, 2010.

(51) Int. Cl.
*B26F 3/00* (2006.01)
*C03B 33/02* (2006.01)
(Continued)

(52) U.S. Cl.
CPC ............. *B26F 3/002* (2013.01); *C03B 33/0215* (2013.01); *C03B 33/033* (2013.01); *C03B 33/037* (2013.01)

(58) Field of Classification Search
CPC .................................................. C03B 33/0215
USPC ............. 225/2, 100–106, 96, 4, 96.5; 65/475, 65/199, 480, 97, 91, 200
See application file for complete search history.

(56) References Cited

U.S. PATENT DOCUMENTS 1,469,379 A * 10/1923 Callard ........................... 65/174
1,885,245 A    11/1932 Fix
(Continued)

FOREIGN PATENT DOCUMENTS

| JP | 3031384 | 10/1992 | ............ C03B 33/033 |
| JP | 2004-323301 | 11/2004 | ............ C03B 33/033 |

(Continued)

OTHER PUBLICATIONS

Nov. 11, 2013 English Translation of Chinese Office Action in counterpart Application No. 2011102563074.
(Continued)

*Primary Examiner* — Kenneth E. Peterson
*Assistant Examiner* — Fernando Ayala
(74) *Attorney, Agent, or Firm* — Matthew J. Mason; Stephen S. Wentsler (57) ABSTRACT

Apparatus and equipment for making glass sheet from a glass ribbon including scoring, bending and separation in vertical state with improved glass ribbon stability provided by edge restrainers located above the score-line that also travel with substantially the same vertical velocity with the elastic ribbon. The edge restrainers on both sides of the glass ribbon serve to limit the motion and perturbation of the ribbon during scoring, bending and separation, advantageously by tensioning the glass ribbon where needed. The invention can reduce disturbance of the glass ribbon in upstream visco-elastic and/or viscous zones due to scoring, bending and separation, therefore enhance forming process stability and product attributes such as thickness variation, stress and stress variation, and the like. The invention can be particularly advantageous for making glass sheet with large width and/or low thickness using the fusion down-draw, slot down-draw, redraw down-draw, and other down-draw processes.

14 Claims, 4 Drawing Sheets

(51) Int. Cl.
*C03B 33/033* (2006.01)
*C03B 33/037* (2006.01)

(56) References Cited

U.S. PATENT DOCUMENTS

| | | | | |
|---|---|---|---|---|
| 2,101,478 | A | 12/1937 | Reich | 33/176 |
| 4,072,259 | A | 2/1978 | Welton | 225/2 |
| 4,113,162 | A | 9/1978 | Boehm et al. | 225/2 |
| 5,165,585 | A | 11/1992 | Lisec | 225/2 |
| 5,297,710 | A | 3/1994 | Juras | 225/2 |
| 6,463,762 | B1 | 10/2002 | Ross, Jr. | 65/105 |
| 6,616,025 | B1* | 9/2003 | Andrewlavage, Jr. | 225/96.5 |
| 6,870,129 | B2 | 3/2005 | Hauer et al. | 219/121.72 |
| 7,146,892 | B2 | 12/2006 | Kienzle et al. | 83/153 |
| 7,260,959 | B2 | 8/2007 | Chang et al. | 65/25.3 |
| 8,245,539 | B2* | 8/2012 | Lu et al. | 65/97 |
| 8,292,141 | B2 | 10/2012 | Cox et al. | 225/2 |
| 8,794,117 | B2 | 8/2014 | Downing et al. | 83/453 |
| 2004/0211218 | A1 | 10/2004 | Jotaki | 65/105 |
| 2006/0042314 | A1* | 3/2006 | Abbott et al. | 65/25.3 |
| 2006/0249553 | A1* | 11/2006 | Ukrainczyk | 225/2 |
| 2007/0039990 | A1* | 2/2007 | Kemmerer et al. | 225/2 |
| 2007/0095108 | A1 | 5/2007 | Kirby et al. | 65/475 |
| 2008/0276646 | A1* | 11/2008 | Chalk et al. | 65/17.2 |
| 2009/0100873 | A1* | 4/2009 | Allan et al. | 65/85 |
| 2009/0250497 | A1* | 10/2009 | Cox et al. | 225/2 |
| 2010/0043495 | A1* | 2/2010 | Kirby et al. | 65/91 |
| 2010/0126226 | A1* | 5/2010 | Zhou et al. | 65/158 |
| 2011/0167873 | A1* | 7/2011 | Anderson et al. | 65/91 |

FOREIGN PATENT DOCUMENTS

| | | | |
|---|---|---|---|
| JP | 2009-542567 | 6/2005 | C03B 17/06 |
| JP | 2008-105882 | 5/2008 | C03B 17/06 |
| WO | WO03/014032 | 2/2003 | C03B 17/06 |
| WO | WO2005/081888 | 9/2005 | C03B 33/02 |
| WO | WO2008/133800 | 11/2008 | C03B 33/09 |
| WO | WO2008/140677 | 11/2008 | C03B 33/02 |
| WO | WO2008/140678 | 11/2008 | C03B 33/027 |
| WO | WO 2008/140818 | 11/2008 | |
| WO | WO 2009/045319 | 4/2009 | B29C 35/08 |
| WO | WO 2009/067164 | 5/2009 | C03B 33/09 |
| WO | WO 2009/091510 | 7/2009 | C03B 33/09 |

OTHER PUBLICATIONS

Jul. 30, 2014 English Translation of Chinese Office Action in counterpart Application No. 2011102563074.

* cited by examiner

FIG. 7

APPARATUS AND METHOD FOR MAKING GLASS SHEET WITH IMPROVED SHEET STABILITY

CROSS-REFERENCE TO RELATED APPLICATION

The present application claims priority to U.S. Provisional Patent Application Ser. No. 61/378,544 filed on Aug. 31, 2010 and entitled "APPARATUS AND METHOD FOR MAKING GLASS SHEET WITH IMPROVED SHEET STABILITY," the content of which is relied upon and incorporated by reference herein in its entirety.

TECHNICAL FIELD

The present invention relates in general to glass sheet-making equipment and method. In particular, the present invention relates to glass sheet stabilizing equipment and method during forming and processing of a glass sheet in a vertical position. The present invention is useful, e.g., in making glass sheet suitable for LCD glass substrates using a down-draw process, such as fusion down-draw or slot down-draw process.

BACKGROUND

Fusion down-draw is a leading technology developed by Corning Incorporated, Corning, N.Y., U.S.A. for making thin, precision glass sheets suitable for use as liquid crystal display (LCD) glass substrates and other opto-electronic devices. This process involves introducing a stream of molten glass into a forming trough called isopipe having two side surfaces converging at a line called root, allowing the glass melt to overflow both top surfaces of the trough of the isopipe called weirs, down along both side surfaces of the isopipe as two molten glass ribbons, join and fuse at the root to form a single glass ribbon, which is then drawn down and cooled below the root to form the glass sheet with desired dimension. In the zone below the root, the glass ribbon travels substantially vertically downward while being drawn and cooled from a viscous state, to visco-elastic and eventually to substantially elastic. The elastic glass ribbon is then cut into individual glass sheets, subjected to further finishing such as edge rounding and polishing, and then packaged and shipped to LCD panel makers for use as TFT or color filter substrates.

One of the advantages of the fusion down-draw process for making glass sheets is that the surface quality of the glass sheets is high because the quality areas thereof were only exposed to the atmosphere and never to a solid material such as the isopipe surface or the forming equipment. This process has been used successfully for making glass sheets having a width as large as 3000 mm and a thickness of about 0.6 mm.

The size of LCDs for the consumer electronics market has increased steadily in the past decade, and along with the image quality desired. These have fueled the demand of large-width glass substrates and posed increasingly more stringent requirements for glass sheet quality, such as edge warp and waviness, sheet warp, surface waviness and roughness, thickness uniformity, as well as stress. In addition, consumers have demonstrated interest in lighter electronics, which call for thinner glass substrates having a thickness of 500 µm, 400 µm, 300 µm or even lower.

Making large-size and/or thin glass sheets using the fusion down-draw is no easy undertaking. Over the years, experts such as the present inventors have gained insights into the many process parameters that can impact the desired attributes of the glass sheets. For example, it was discovered that the separation of glass sheets from the ribbon when the glass is substantially elastic can lead to undesirable motion of the glass ribbon above the separation line, which can propagate into the visco-elastic zone, and even the viscous zone, and thereby affect the attributes of the sheet formed in those zones.

Therefore, there remains a need of an apparatus and method for making glass sheets with desirable attributes at an acceptable yield with improved ribbon stability. The present invention satisfies this and other needs.

SUMMARY

Several aspects of the present invention are disclosed herein. It is to be understood that these aspects may or may not overlap with one another. Thus, part of one aspect may fall within the scope of another aspect, and vice versa.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa.

Thus, a first aspect of the present disclosure relates to a process for making a target glass sheet, comprising the following steps:

(A) providing a precursor glass ribbon comprising an elastic portion, the elastic portion having a thickness T1, a width W1, a first major surface S1 having a target point TP traveling with a velocity V1 parallel to the gravity vector, a second major surface S2 opposing S1, S1 comprising a first peripheral region PR1, a second peripheral region PR2 and a first center region CR1; S2 comprising a third peripheral region PR3, a fourth peripheral region PR4 and a second center region CR2, where PR1 is in opposing relation to PR3, PR2 is in opposing relation to PR4, and CR1 is in opposing relation to CR2;

(B) contacting a first edge restrainer ER1 traveling with a downward velocity substantially equal to V1 with at least one of PR1 and PR3 at a first restrainer location above a horizontal line SL passing through the point TP;

(C) contacting a second edge restrainer ER2 traveling with a downward velocity substantially equal to V1 with at least one of PR2 and PR4 at a second restrainer location above the line SL;

(D) contacting a third edge restrainer ER3 with at least one of PR1 and PR3 at a third restrainer location below the line SL;

(E) contacting a fourth edge restrainer ER4 traveling with a downward velocity substantially equal to V1 with at least one of PR2 and PR4 at a fourth restrainer location below the line SL;

(F) applying a first tensioning force F1 perpendicular to V1 to the elastic portion by the first edge restrainer, and a second tensioning force F2 opposite to F1 to the elastic portion by the second edge restrainer;

(G) forming a transverse score-line along the line SL on S1 below the locations of the first edge restrainer and the second edge restrainer;

(H) applying to the elastic portion a breaking force F3 perpendicular to the elastic portion below the score-line and a supporting force F4 above the score-line in a direction opposite to that of F3, the direction of F3 being pointing from S1 to S2, thereby breaking the elastic portion along the score-line to obtain the target glass sheet below the score-line; and (I) releasing ER1 and ER2 from the elastic portion after step (H).

In certain embodiments of the first aspect of the present disclosure, the process further comprises a following step (H1) after step (H) but before step (I):

(H1) reducing F1 and F2 continuously to substantially zero.

In certain embodiments of the first aspect of the present disclosure, the process further comprises a step (H2) after step (H) but before step (I):

(H2) reversing the directions of F1 and F2.

In certain embodiments of the first aspect of the present disclosure, the edge restrainers ER1 and ER2 contact a substantially flat area of PR1 and/or PR3, PR2 and/or PR4, respectively.

In certain embodiments of the first aspect of the present disclosure, the distances between the edge of the glass ribbon and the locations of the centers of the areas of ER1 and ER2 contacting the glass ribbon are at most 40 cm, in certain embodiments at most 30 cm, in certain other embodiments at most 20 cm, in certain other embodiments at most 10 cm, in certain other embodiments at most 5 cm.

In certain embodiments of the first aspect of the present disclosure, the distance between the score-line SL and the locations of the centers of the areas of ER1 and ER2 contacting the glass ribbon is at most 40 cm, in certain embodiments at most 30 cm, in certain other embodiments at most 20 cm, in certain other embodiments at most 10 cm, in certain other embodiments at most 5 cm.

In certain embodiments of the first aspect of the present disclosure, prior to steps (B), (C), (D), (E) and (F), S2 above the line SL exhibits a curvature from PR1 to PR2. In certain specific embodiments, the curvature comprises a dome-shape when viewed from the side of S2.

In certain embodiments of the first aspect of the present disclosure, the process further comprises the following step (E1) before step (F):

(E1) applying a force F5 to the elastic zone above the line SL such that the curvature is not reversed during steps (F) and (G) and is maintained after step (I).

In certain specific embodiments of the foregoing embodiment, step (E1) is carried out during steps (F), (G) and (H).

In certain specific embodiments, F5 is applied by a method selected from the following:

(F5a) maintaining a higher air pressure on the side of S2 than on the side of S1;

(F5b) blowing a gas stream against part of CR2 of S2 such that S2 is pushed toward S1;

(F5c) pushing S2 toward S1 by a pin in contact with CR2; and (F5d) a combination of at least two of (F5a), (F5b) and (F5c).

In certain specific embodiments of the preceding embodiment, (F5b) is applied, and the contact area in CR2 of the gas stream is within 50 cm above the score-line, in certain embodiments within 40 cm above the score-line, in certain other embodiments within 30 cm above the score-line, in certain other embodiments within 20 cm above the score-line.

In certain specific embodiments of the relevant preceding embodiments, the force F5 is less than 20 newton, in certain embodiments less than 10 newton, in certain embodiments less than 5 newton.

In certain embodiments of the first aspect of the present disclosure, steps (B) and (C) are carried out substantially simultaneously.

In certain embodiments of the first aspect of the present disclosure, steps (D) and (E) are carried out substantially simultaneously.

In certain embodiments of the first aspect of the present disclosure, S1 comprises a centerline CL1, and ER1 and ER2 are located substantially symmetrically with respect to CL1 in steps (F), (G) and (H).

In certain embodiments of the first aspect of the present disclosure, S1 comprises a centerline CL1, and ER3 and ER4 are located substantially symmetrically with respect to CL1 in steps (F), (G) and (H).

In certain embodiments of the first aspect of the present disclosure, step (F) precedes step (G).

In certain embodiments of the first aspect of the present disclosure, a nosing contacts S2 in the vicinity of the score-line during step (G).

In certain specific embodiments of the preceding embodiment, the nosing is a flat nosing bar extending from PR3 to PR4 contacting S2 covering the score-line during step (G).

In certain specific embodiments of the relevant preceding embodiments, the nosing maintains contact with S2 during step (H).

In certain specific embodiments of the relevant preceding embodiments, the nosing is released from S2 during or after step (I).

In certain embodiments of the first aspect of the present disclosure, steps (B) and (C) precede steps (D) and (E), and step (G) precedes step (F).

In certain specific embodiments of the preceding embodiment, a nosing contacts S2 in the vicinity of the score-line during step (G).

In certain specific embodiments of the preceding embodiment, wherein during step (G), the nosing contacts S2 and/or S1 along the score-line, and the nosing is adjusted to conform to the curvature of S2 and/or S1 without substantially deforming the curvature of S2.

In certain specific embodiments of the preceding embodiment, after step (G), during step (H), the nosing maintains contact with S2 and/or S1 and is adjusted to maintain the contact area in substantially a flat plane.

In certain specific embodiment of the preceding embodiment, after step (H), during or after step (I), the nosing is adjusted to restore the curvature of S2 to that before step (G) before the nosing is released from S1 and/or S2.

In certain embodiments of the first aspect of the present disclosure, ER1 and ER2 are selected from suction cups, clamps and rollers.

In certain embodiments of the first aspect of the present disclosure, ER1, ER2, ER3 and ER4 contact S2 and do not contact S1 during steps (F), (G) and (H).

In certain embodiments of the first aspect of the present disclosure, ER1, ER2 and the nosing are fixed on a platform capable of reciprocal vertical motion.

In certain embodiments of the first aspect of the present disclosure, the precursor glass ribbon further comprises a visco-elastic zone traveling with the velocity V1' within 10 meters above the score-line, in certain embodiments within 5 meters, in other embodiments within 3 meters, in other embodiments within 2 meters, in other embodiments within 1 meter, in other embodiments within 0.5 meters, where V1' is parallel to V1.

In certain embodiments of the first aspect of the present disclosure, the precursor glass ribbon further comprises a viscous zone within 12 meters above the score-line, in certain embodiments within 10 meters, in certain embodiments within 8 meters, in certain embodiments within 5 meters, in certain embodiments within 3 meters, in certain embodiments within 2 meters, in certain embodiments within 1 meter.

In certain embodiments of the first aspect of the present disclosure, the ratio W1/T1 of the elastic zone is at least 1000, in certain embodiments at least 2000, in certain other embodiments at least 3000, in certain other embodiments at least 5000.

In certain embodiments of the first aspect of the present disclosure, T1 of the glass ribbon in CR1 in the elastic zone is at most 1.0 mm, in certain embodiments at most 0.8 mm, in certain embodiments at most 0.7 mm, in certain other embodiments at most 0.6 mm, in certain embodiments at most 0.4 mm, in certain other embodiments at most 0.3 mm.

In certain embodiments of the first aspect of the present disclosure, step (G) comprises:

(Ga) forming the score-line by scoring S1 using a mechanical scoring wheel.

In certain embodiments of the first aspect of the present disclosure, step (G) comprises:

(Gb) forming the score-line by exposing S1 to a laser beam.

In certain embodiments of the first aspect of the present disclosure, steps (B), (C), (D), (E), (F), (G) and (H) are repeated after step (I) so that a second target glass sheet is produced.

In certain embodiments of the first aspect of the present disclosure, step (A) comprises:

(A1) providing a glass melt;

(A2) forming a continuous glass ribbon from the glass melt by a down-draw process; and (A3) cooling the continuous glass ribbon to form the precursor glass ribbon.

In certain embodiments of the preceding embodiment, in step (A2), the down-draw process is selected from a fusion down-draw process, a slot down-draw process and a re-draw process.

A second aspect of the present disclosure relates to an apparatus for making a target elastic glass sheet from a continuously moving precursor glass ribbon having an elastic portion comprising a first major surface S1, a second major surface S2 opposing S1, S1 comprising a first peripheral region PR1, a second peripheral region PR2, and a first center region CR1, S2 comprising a third peripheral region PR3 opposing PR1, a fourth peripheral region PR4 opposing PR2, and a second center region CR2 opposing CR1, comprising:

(I) at least one pair of rotatable edge rollers having substantially stationery axles relative to the earth capable of engaging PR1, PR3, PR2 and PR4 to provide a substantially constant downward velocity V1 parallel to the gravity vector to the elastic portion of the precursor glass ribbon;

(II) a scoring device capable of providing a substantially horizontal score-line on the surface S1;

(III) a nosing adapted for: (a) contacting and engaging S2 to stabilize the precursor glass ribbon; (b) traveling at a velocity substantially equal to V1; and (c) providing a supporting force F4 perpendicular to S1 during bending of the precursor glass ribbon pointing from S2 to S1;

(IV) a first edge restrainer ER1 adapted for: (a) contacting at least one of PR1 and PR3 above the score-line; (b) traveling at a velocity substantially equal to V1; and (c) providing a tensioning force F1 to the elastic portion perpendicular to the velocity V1;

(V) a second edge restrainer ER2 adapted for: (a) contacting at least one of PR2 and PR4 above the score-line; (b) traveling at a velocity substantially equal to V1; and (c) providing a tensioning force F2 to the elastic portion perpendicular to the velocity V1 having a direction opposite to F1;

(VI) a third edge restrainer ER3 adapted for: (a) contacting at least one of PR1 and PR3 below the score-line; (b) traveling at a velocity substantially equal to V1; and (c) providing at least part of a bending force F3 to the elastic portion in a direction perpendicular to S1 and opposite to F4; and (VII) a fourth edge restrainer ER4 adapted for: (a) contacting at least one of PR2 and PR4 below the score-line; (b) traveling at a velocity substantially equal to V1; and (c) providing at least part of the bending force F3.

In certain embodiments of the second aspect of the present disclosure, ER1, ER2 and the nosing are all mounted on a common platform adapted for traveling at a velocity substantially equal to V1.

In certain embodiments of the second aspect of the present disclosure, the apparatus further comprises:

(VIII) a gas nozzle adapted for blowing a gas stream toward CR2 to provide a force F5 to the precursor glass ribbon having a direction pointing from S2 to S1.

In certain embodiments of the second aspect of the present disclosure, ER1, ER2, ER3 and ER4 are selected from suction cups and clamps.

In certain embodiments of the second aspect of the present disclosure, ER1 and ER2 are adapted for contacting the same and only one of S1 and S2.

In certain embodiments of the second aspect of the present disclosure, ER1 and ER2 are adapted for contacting both S1 and S2.

In certain embodiments of the second aspect of the present disclosure, ER1, ER2, ER3 and ER4 are adapted for contacting S2 only.

In certain embodiments of the second aspect of the present disclosure, the precursor glass ribbon comprises a center line CL1 on S1, and ER1 and ER2 are placed essentially symmetrically relative to CL1.

In certain embodiments of the second aspect of the present disclosure, the precursor glass ribbon comprises a center line CL1 on S1, and ER3 and ER4 are placed essentially symmetrically relative to CL1.

In certain embodiments of the second aspect of the present disclosure, ER1 and ER2 are adapted for contacting the precursor glass ribbon in a synchronized manner.

In certain embodiments of the second aspect of the present disclosure, ER1, ER2, ER3 and ER4 are adapted for contacting the precursor glass ribbon in a synchronized manner.

One or more embodiments and/or aspects of the present disclosure have one or more of the following advantages. First, the present invention can provide significant process stability to any downward glass sheet forming process by controlling and reducing upward sheet motion caused by sheet scoring, bending and separation, including fusion down-draw, slot-draw, heating-and-redraw, rolling-followed-by-drawing, and the like. Second, by reducing downstream sheet motion that could propagate upwards to the visco-elastic and even the viscous zones of the precursor glass ribbon, the present invention can result in glass sheets having consistent attributes such as stress, stress distribution, thickness and thickness variation, and the like. Third, for glass sheets having a high flexibility characterized by large sheet width or low sheet thickness or both, one of the bottlenecks for a successful commercial sheet glass-making process is yield at the BOD due to sheet motion and curvature instability and even bow-popping. The present invention can be an enabler for making such thin and/or wide products. Lastly, the present invention can be easy to implement, since the edge restrainers can be retrofitted into an existing production line or installed on a new line at a relatively low cost.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION

Unless otherwise indicated, all numbers such as those expressing weight percents and mole percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a suction cup" includes embodiments having one, two or more such suction cups, unless the context clearly indicates otherwise.

In a typical down-draw process for making glass sheet, a viscous glass ribbon is first formed at the root of the isopipe in the case of fusion down-draw process, at the slot in the case of slot down-draw process, and by reheating in a re-draw process. The viscous glass ribbon is then drawn down into a thinner ribbon while being cooled down. As the temperature decreases, the glass ribbon changes from viscous to visco-elastic and eventually becomes substantially elastic. The viscous, visco-elastic and elastic zones below the forming apparatus where the viscous ribbon is formed and processed are collectively called bottom of draw (BOD) for the purpose of convenience in description in the present application.

Traditionally, in the BOD area, the glass ribbon is typically guided and pulled by rollers such as edge rollers until it is separated into individual glass sheets by a sheet separation device. The rotational axes of these rollers tend to be maintained stationery relative to the forming device or the earth, which provides, in part, the force that allows the glass ribbon to travel downward continuously, enabling a continuous glass sheet forming process. In a typical BOD set-up, the sheet separation device can comprise the following components: (1) a robot tooling which engages with the travelling ribbon by, e.g., suction cups, secures the ribbon and moves with it; and (2) a Travelling Anvil Machine (TAM) including a vertical moving carriage to synchronize with sheet speed. On TAM, a horizontal mechanical scoring device can be used to form a straight score-line (flaw) across the sheet (except bead regions) held in contact with and against a piece of nosing bar to facilitate sheet separation. The nosing bar is typically slightly narrower than the full sheet width due to the presence of enlarged edges (typically called beads). Likewise, the score-line is typically slightly shorter than the full sheet width due to the presence of the beads. Upon the formation of the score-line, the robot tooling bends the sheet against the nosing and separates the sheet from the ribbon along the score-line. The nosing bar moves forward during scoring and separation and retracts after separation. The robot tooling transports the separated glass sheet to a sheet transport device such as a crate or a conveyor belt. In a stable manufacture process, this process repeats to produce multiple glass sheets, which are further finished and then used for the end applications, such as the glass substrates for LCDs. Co-assigned, co-pending U.S. patent application Ser. No. 12/507,248 filed on Jul. 22, 2009 and entitled "METHODS AND APPARATUS FOR INITIATING SCORING," WO08/140,677 and WO08/140,678 disclose the apparatus for separating glass sheets at the BOD, the contents of which are incorporated herein by reference in their entirety.

The scoring, bending and separation processes at the BOD can transfer undesirable energy into the glass ribbon above the score-line, imparting motion and shape changes thereto, which may propagate upwards from the elastic zone to the visco-elastic zone, and even to the viscous zone. In an exemplary process, it can be desirable to maintain a small, stable curvature along the width to the elastic glass ribbon before scoring, bending and separation, so that the ribbon along the draw has higher stiffness. A particularly undesirable shape change imparted by the scoring, bending and separation is the reversal of the curvature direction of the glass ribbon. Disturbance of the visco-elastic zone caused by the repeated scoring, bending and separation of the glass ribbon, if not controlled, can result in undesirable sheet thickness and thickness variation, sheet stress and stress variation, warp, curvature and other critical product attributes. Process tuning to reduce the disturbance to an acceptable level can last a long time before quality glass sheets can be produced reliably at an acceptable yield.

The present inventors have found that the flexibility of an elastic glass ribbon, defined as the ratio of W1/T1 herein, where W1 is the width in mm, and T1 is the thickness in mm, greatly impacts the process stability of a down-draw process.

The larger the ribbon flexibility, the more likely the glass ribbon is subjected to process instability due to BOD scoring, bending and separation. For example, a glass ribbon having a width of over 3000 mm is much more likely to undergo curvature reversal at the BOD than a glass ribbon having a width of lower than 2500 mm, assuming both have a thickness of 700 µm. Therefore, it is much more difficult to make a glass sheet having a width of over 3000 mm than a glass sheet with a 2500 mm width with the same thickness with the same degree of warp, stress, stress variation and thickness variation requirements. By the same token, it is much more difficult to make a glass sheet having a width of 2000 mm and a thickness of 400 µm than a glass sheet with the same width but a much higher thickness of 700 µm. Significant stabilization improvement to the glass ribbon during separation for large-size or thin-thickness, high-flexibility glass sheet would be highly desirable.

Figure 6:
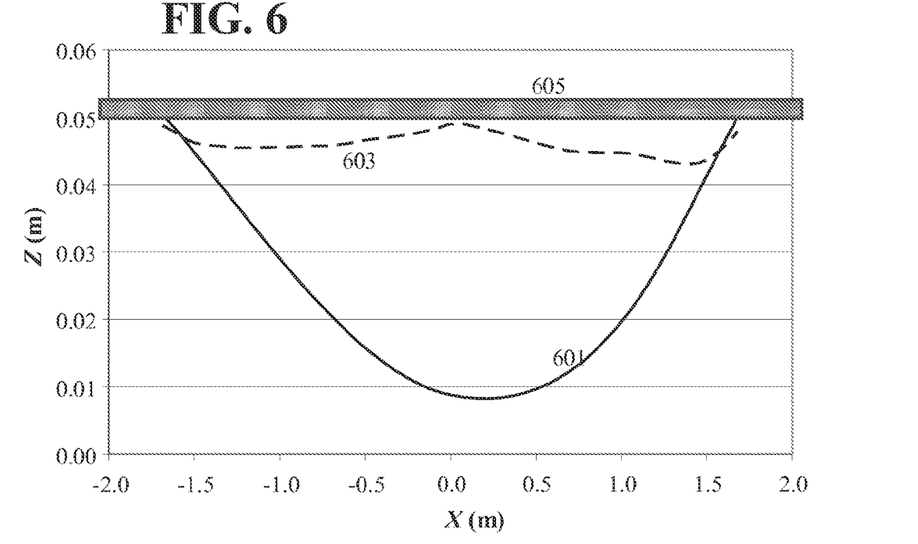
FIG. 6 is a diagram showing the impact of scoring on sheet curvature.

To illustrate the possible perturbation to the visco-elastic zone of the glass ribbon caused by the scoring process in a conventional down-draw glass forming process without utilizing the stabilizing apparatus and method of the present invention wherein the glass ribbon is restrained by fixed rollers the axles of which do not travel downward along with the glass ribbon, a mathematical simulation was conducted and the result is shown in FIG. 6. In this figure, the horizontal axis is distance from center of ribbon along a straight score-line SL from one peripheral region to the opposite peripheral region, the vertical axis is distance from the ribbon surface to the nosing bar. The nosing bar is shown as 605. 601 shows the position of the curved glass ribbon prior to scoring, and 603 shows the curved ribbon immediately after scoring. Thus, typically the glass ribbon exhibits a bow curvature relative to a vertical plane prior to scoring. During scoring, if a flat and rigid nosing 605 is used, the curvature will be pressed down to conform to the nosing surface, thus the bow shape of the glass ribbon is forced to distort. The energy inducing the distortion of the glass ribbon can cause vibration to the glass ribbon, or shape change that can propagate upwards into the visco-elastic zone, causing permanent changes to the sheet attributes, such as thickness variation, stress, warp and waviness and the like.

Modeling and experiments further showed that the bending-separation step after scoring can induce even more significant ribbon shape change and vibration that can propagate into the visco-elastic zone in a conventional down-draw forming process mentioned in the preceding paragraph. Such sheet change can frequently include the reversal of the direction of the glass ribbon called bow-popping. Bow-popping is particularly detrimental to glass ribbon forming process stability and product attributes.

The present disclosure relates to a glass ribbon stabilizing apparatus and process particularly suitable for down-draw glass sheet forming. Such down-draw sheet forming process can include, but are not limited to: fusion down-draw, slot down-draw, redraw down-draw, rolling followed by down-draw, and the like. In various aspects and embodiments, the present invention achieves one or more of the following: (i) reducing energy input to the glass ribbon; (ii) dampening the ribbon motion; and (iii) reinforcing the curvature of the glass ribbon during scoring, during bending, during separation and after separation.

Next, various aspects of the present invention will be further described by reference to the appended drawings. It should be noted that the drawings are for illustrating specific embodiments and aspects only, and should not be interpreted to limit the present invention in any way. Like reference signs in the drawings have the same or similar meaning.

Figure 1:
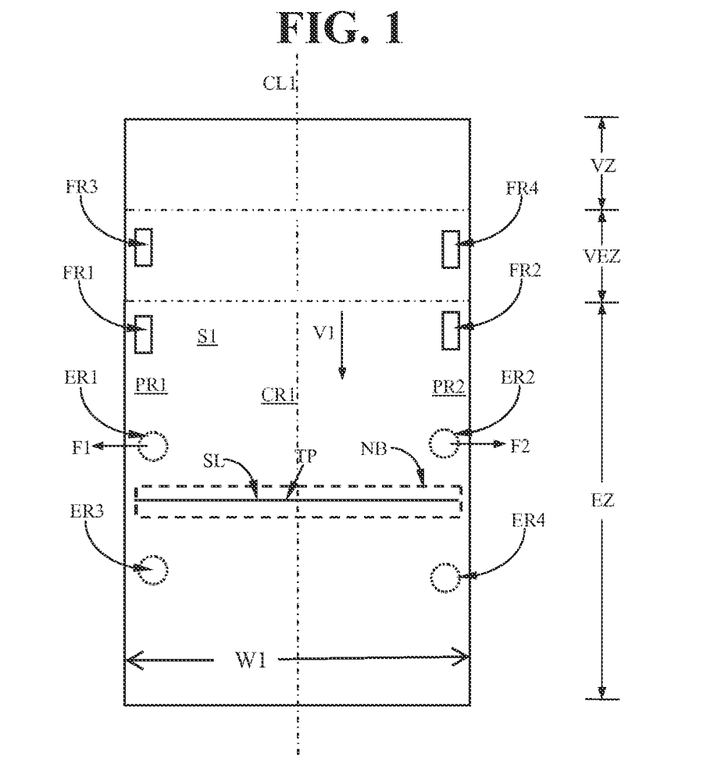
FIG. 1 is a schematic drawing showing a plan view of an apparatus operating according to an embodiment of the process of the present invention, when viewed from the side of surface S1.
Figure 2:
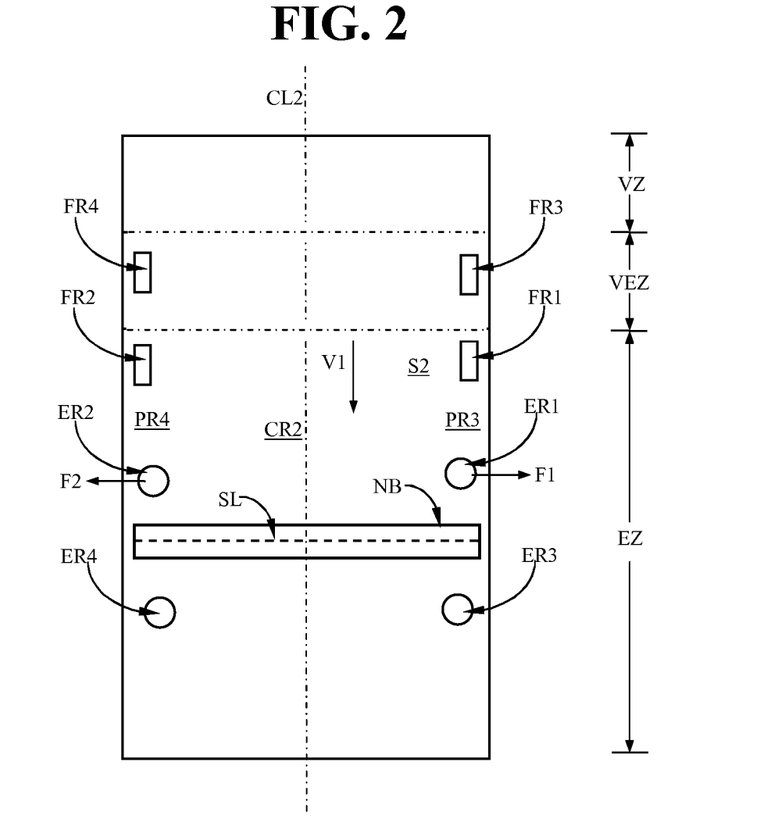
FIG. 2 is a schematic drawing showing a plan view of the same apparatus shown in FIG. 1, when viewed from the side of surface S2.
Figure 3:
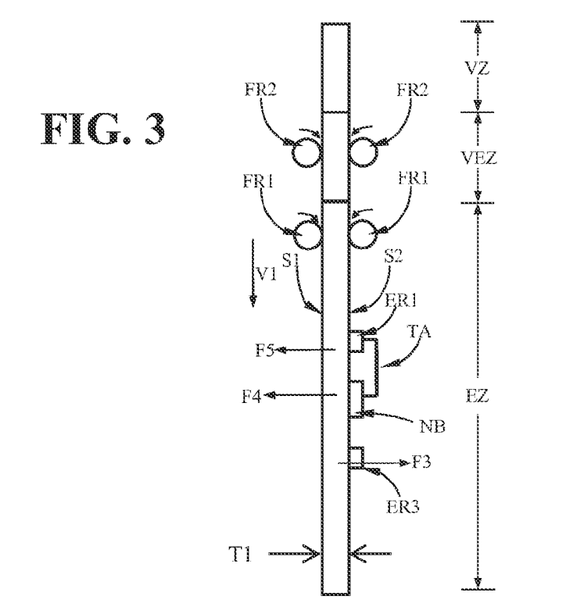
FIG. 3 is a schematic drawing showing a side view of the same apparatus shown in FIG. 1.

In the present invention, edge restrainers are used to restrain both edges of the glass ribbon before at least one of the scoring step and the bending and separation step, as illustrated in FIGS. 1, 2 and 3. As mentioned supra, in the conventional forming process, stationery edge rollers were used to restrain the edges of the glass ribbon to stabilize the ribbon positions. However, due to the fixed axles of the rollers, the distance between the score-line and the rollers increases during the scoring, bending and separation steps. As the distance between the stationery rollers and the score-line grows, so is the area therebetween and the flexibility of the ribbon in this area. The large, growing area is relatively easily subjected to distortions mentioned above. The present invention, by utilizing edge restrainers that travel substantially at the same downward velocity with the intended score-line capable of active tensioning of the glass ribbon, can significantly reduce the flexibility, and maintain a high level of rigidity, of the glass ribbon between the score-line and the edge restrainer, thereby significantly reducing the possibility of substantial sheet shape distortion that can propagate upwards into the visco-elastic zone.

As mentioned above, the precursor glass ribbon to be processed according to the present invention may be produced by a fusion down-draw process using an isopipe as disclosed in WO03/014032, WO05/081888, and the like, the relevant contents thereof are incorporated herein by reference in their entirety. Alternatively, the precursor ribbon may be produced by slot down-draw, wherein a stream of molten glass flows through a slot of a vessel to form a viscous ribbon, which is cooled and drawn downward to form a rigid and elastic glass sheet. Still, it is also contemplated that the precursor glass ribbon may be formed by reheating a pre-formed glass sheet in a furnace to viscous and/or visco-elastic state, then drawing down to a lower thickness and cooling to elastic state. It is further contemplated that the precursor glass ribbon may be formed by a rolling process, such as rolling a molten glass gob or a thicker glass sheet, followed by down-drawing, thinning and cooling. Thus, in particularly advantageous embodiments of the present invention, the precursor glass ribbon comprises a viscous zone VZ, a visco-elastic zone VEZ and an elastic zone EZ. However, it should be noted that in certain embodiments, the precursor glass ribbon may comprise a visco-elastic zone VEZ and an elastic zone EZ only without a viscous zone VZ such as in a redraw down-draw process, and still in other embodiments, the continuous precursor glass ribbon may comprise an elastic zone EZ only without a visco-elastic zone VEZ or a viscous zone such as in a precision vertical glass sheet cutting process. The elastic portion of the precursor glass ribbon travels downward with a velocity V1 parallel to the gravity vector. While it is possible that the elastic portion may travel with a velocity having a non-zero component V2 perpendicular to the gravity vector in addition to V1, it is desirable in a number of embodiments that the total velocity vector of the elastic portion is equal to V1, thus the elastic portion travels substantially downward only. In these embodiments, gravity has less impact on the overall ribbon shape and shape change compared to those in which V2≠0.

The elastic portion of the precursor glass ribbon has two major surfaces S1 and S2, each having two peripheral regions PR1 and PR2, PR3 and PR4, a center region CR1 and CR2, respectively. In certain embodiments, such as in the process of making glass sheets for LCD glass substrates, it is highly desired that the center region of at least one of S1 and S2 of the glass ribbon be pristine and not subjected to direct contact with a solid object unless absolutely necessary. Such area to be protected is typically called "quality area." On the other hand, the peripheral area close to the edges are where stabilizing and guiding devices such as rollers and the edge restrainers of the present invention are to be applied. In certain embodiments, e.g., where the glass ribbon is formed at the BOD area of a fusion down-draw or slot down-draw process, the opposing peripheral regions, such as PR1 and PR3, PR2 and PR4, can together define an edge having a enlarged thickness called "bead." It is highly desired that the edge restrainers are located in areas of the peripheral regions where secure contact can be established. Thus, where the edge restrainers are suction cups, it is highly desired that where the edge restrainers contact the glass surface is substantially flat. The distance from the center of the edge restrainers ER1 and ER2 contacting the glass surface is desired to be within 50 cm, in certain embodiments 40 cm, in certain other embodiments within 30 cm, in certain other embodiments 20 cm, still in other embodiments within 10 cm, from the very outside edges of the peripheral region. The closer the edge restrainers to the very outside edge of the peripheral region, the less likely the edge restrainers will come into contact with the quality area, thus the more likely to result in larger area of useable glass.

The score-line on the glass ribbon can be chosen at any location on the glass ribbon according to the needs of the glass-making process. Factors determining the location of the score-line, hence the location where a glass sheet is separated from the continuously formed glass ribbon include, but are not limited to: (i) the dimension of the final glass sheet to be sold and/or used; (ii) dimension of the forming device; (iii) whether a defect has been detected in a glass ribbon before separation; and (iv) dimension and range of the travelling anvil machine which can carry the scoring assembly, ER1 and ER2; and the like. Thus, the target point TP in the major surface S1 can be chosen by one skilled in the art based on the product and process. The distance between the score-line and the center of the locations of the edge restrainers ER1 and ER2 contacting the glass ribbon can be, e.g., within 50 cm, in certain embodiments within 40 cm, in certain embodiments 30 cm, in certain embodiments within 20 cm, in certain embodiments within 10 cm, in certain other embodiments within 5 cm. The closer the edge restrainers ER1 and ER2 to the score-line, the more likely the restraining effect can be achieved during scoring, bending and separation.

In steps (B) and (C), ER1 and ER2 are allowed to engage the corresponding peripheral regions. In order not to disturb or alter the motion of the glass ribbon, it is desired that ER1 and ER2 travel with substantially the same downward velocity V1 as the target point TP when each of them engages the glass ribbons. Steps (B) and (C) may be carried out at different times, as long as at the time of initial contacting, ER1 and ER2 do not exert a tensioning, compressing or twisting force to the glass ribbon. However, it is desired that the motion of ER1 and ER2 are synchronized, i.e., steps (B) and (C) are carried out at substantially the same time, such that the glass ribbons are restrained and engaged on both sides in a substantially synchronized manner. It is desired that when steps (B) and (C) are first carried out, i.e., when ER1 and ER2 are first allowed to contact and engage the glass sheet, ER1 and ER2 do not exert a lateral force, i.e., force perpendicular to the gravitational vector, so that the glass ribbon is not subjected to tensioning, compressing and/or twisting. The locations of ER1 and ER2 in PR1 and PR2 can be advantageously symmetrical with respect to the center line CL1 of S1, because such symmetry can result in more stable glass ribbon when F1 and F2 are applied, and less stress to other glass ribbon stabilizing devices such as upper fixed roller pairs.

In steps (D) and (E), ER3 and ER4 are allowed to engage the corresponding peripheral regions. Edge restrainers ER3 and ER4 contact and engage the glass ribbon at a location lower than the TP, the predetermined score-line SL, and the locations of edge restrainers ER1 and ER2. In order not to disturb or alter the motion of the glass ribbon, it is desired that ER3 and ER4 travel with substantially the same downward velocity V1 as the target point TP when each of them engages the glass ribbons. Steps (D) and (E) may be carried out at different times, as long as at the time of initial contacting, ER3 and ER4 do not exert a tensioning, compressing or twisting force to the glass ribbon. However, it is desired that the motion of ER3 and ER4 are synchronized, i.e., steps (D) and (E) are carried out at substantially the same time, such that the glass ribbons are restrained and engaged on both sides in a substantially synchronized manner. It is desired that when steps (D) and (E) are first carried out, i.e., when ER3 and ER4 are first allowed to contact and engage the glass sheet, ER3 and ER4 do not exert a lateral force, i.e., force perpendicular to the gravitational vector, so that the glass ribbon is not subjected to tensioning, compressing and/or twisting.

Steps (B), (C), (D) an (E) can be carried out in any order as long as the initial contact and engagement of ER1, ER2, ER3 and ER4 do not cause unwanted sheet motion or exert unwanted forces to the sheet. Nonetheless, it is desired that steps (B) and (C) are carried out substantially simultaneously and in a synchronized manner as described supra, and steps (D) and (E) are carried out substantially simultaneously and in a synchronized manner, as described supra. In another desired embodiment, steps (B) and (C) are carried out prior to steps (D) and (E). In yet another desired embodiment, steps (B), (C), (D) and (E) are carried out substantially simultaneously and in a synchronized manner.

In step (F), after the initial contacting and engaging of ER1 and ER2 in steps (B) and (C), tensioning forces F1 and F2 are applied to the glass ribbon above the intended score-line SL. The application of F1 and F2 is desirably conducted in a synchronized manner, i.e., the forces F1 and F2 are substantially equal in magnitude, though in opposite directions, from the start of the imposition to the reduction and the eventual elimination. It is desired that F1 and F2 are substantially parallel to the major surface S1, such that the application thereof does not cause a twisting moment to the glass ribbon. In addition, being tensioning forces, their directions are from the center region to the peripheral regions, resulting in a tensional force inside the glass ribbon. The tensioning forces F1 and F2 function to achieve several effects: (a) stabilizing the glass ribbon during scoring, bending and separation; (b) changing the curvature of the glass ribbon along the width W1 thereof so that in conforms to the requirements of the nosing bar which is to be described in greater detail infra; and (c) preventing or reducing motion of the glass ribbon caused by scoring, bending and separation from propagating too far above.

In step (G), a score-line is formed on the glass ribbon below ER1, ER2, but above ER3 and ER4. Such score-line can be generated by using mechanical, thermal and/or optical means known to one skilled in the art. Desirably, the score-line SL is substantially perpendicular to the gravity vector.

In step (H), a target glass sheet is separated from the glass ribbon along the score-line formed in step (G) by bending and separation. Bending is effected by a supporting force F4 above or along the score-line SL, which may be exerted by a nosing bar, and a breaking force F3 below the score-line SL, which may be exerted by ER3 and/or ER4. The two opposite forces F3 and F4 produce a bending moment to the glass ribbon along the score-line, which, at an amount large enough and determined by one skilled in the art, causes the breakage and separation of the target glass sheet from the ribbon.

As mentioned summarily supra, the edge restrainers ER1, ER2, ER3 and ER4 travel at substantially the same vertical velocity of the elastic portion of the glass ribbon. Above the edge restrainers, the glass ribbon may be further secured and guided at the edge portions by a series of fixed roller pairs FR1, FR2, FR3 and FR4 in the elastic zone EZ and/or the visco-elastic zone VZ. The fixed roller pairs in practice can be pulling rollers, edge rollers or stub rolls that are either driven by motors (active) or idle (passive), or a combination of both types. The axles of these rollers may be substantially parallel to the gravity vector, or have an angle relative to the gravity vector. The fixed roller pairs thus hold the glass ribbon in place, stabilize it to some extent and provide the desired velocity to the elastic portion of the glass ribbon. It is highly desired that the surfaces of the fixed rollers do not slip with respect to the glass surface during operation. Thus, it is desired that the surface speed of the rollers located in the elastic region is substantially the same as the total velocity of the elastic portion of the glass ribbon. In certain desired fusion down-draw and slot down-draw processes where the glass ribbon travels with a velocity substantially parallel to the gravity vector, it is desired that the fixed rollers in combination provide the downward velocity V1 to the glass ribbon. In those embodiments, the combination of the fixed roller pairs and the edge restrainers together stabilize the glass ribbon below the forming device.

In certain embodiments of the process of the present invention, it is desired that after step (H) but before step (I), a step (H1) is carried out:

(H1) reducing F1 and F2 continuously to substantially zero.

By carrying out step (H1), the glass ribbon above the score-line will remain substantially restrained by ER1 and ER2 immediately after bending and separation of a glass sheet from the glass ribbon. It is believed that a sudden reduction of F1 and/or F2 to substantially zero, e.g., the complete elimination of the tensioning force by ER1 and ER2 in a short period of time, can cause the energy stored in the glass ribbon as a result of the tensioning to uncontrollably release, which may result in the generation of undesirable ribbon motion that can propagate upwards to the visco-elastic zone VEZ and even the viscous zone VZ. The slow and controlled reduction of F1 and F2, hence the slow and controlled release of ER1 and ER2 from the glass ribbon above the score-line, allows for the slow release and absorption of the energy stored in the glass ribbon due to the forced shape change during scoring, bending and separation. It is desired that after at any time when F1 and F2 are applied to the glass ribbon, the magnitude of F1 and F2 are substantially the same and the directions thereof are substantially opposite to each other.

In certain embodiments, after step (H) but before step (I), optionally after the step (H1) described supra, a step (H2) is carried out:

(H2) reversing the directions of F1 and F2.

It is believed that by reversing the directions of F1 and F2, i.e., by changing the forces applied by ER1 and ER2 from tensioning to compressing after bending and separation and after F1 and F2 are both reduced to substantially zero can be beneficial to maintain the direction of the curvature (bow) of the glass ribbon. One skilled in the art can determine the right amount of compressive forces F1 and F2 in step (H2), such that the glass ribbon would not be significantly pressed to buckle along the width (W1) of the glass ribbon to an extent significantly larger than the original curvature thereof without the application of a lateral force thereto (i.e., where F1=F2=0). Similar to step (H1), after step (H2), it is generally desired that before step (I), the forces F1 and F2 are gradually reduced to zero so that no unwanted motion of the glass ribbon may be produced as a result of the reduction and elimination of F1 and F2.

As described supra, the present invention, by utilizing edge restrainers ER1 and ER2, has the capability to stabilize the glass ribbon during scoring, bending and separation. The glass ribbon may be substantially flat above the score-line before the engagement of ER1, ER2, ER3, ER4 and/or the nosing. In certain advantageous embodiments, the glass ribbon exhibits a curvature from PR1 and PR2 before the engagement of the edge restrainers to the glass ribbon. Such natural curvature may be caused by, e.g., intentional forming set-up, cooling after forming and mechanical impartation as a result of the tensioning and/or compressing forces applied by the driving mechanisms such as edge pulling rolls, stub-rolls, and the like. Such curvature from PR1 to PR2, when viewed from the side of the surface S2, may have a shape with protruding center region CR2, called 'bowl-shape" or a shape with a depressing center region CR1, called "dome-shape."

As mentioned supra, during the scoring, bending and separation of a target glass sheet from the glass ribbon, if the glass ribbon exhibits a curvature from PR1 and PR2 as discussed above prior to the engagement of ER1, ER2, ER3, ER4 and/or the nosing, it is highly undesirable that the curvature of the glass ribbon reverses direction. Such curvature reversal is sometimes called "bow-popping," which can cause significant amount of sheet motion that can travel upwards into the visco-elastic zone VEZ and/or the viscous zone VZ, which, in turn, can alter the attributes of the glass ribbon such as stress and stress distribution, thickness variation and the like. In order to further stabilize the glass ribbon, in certain embodiments of the present invention, it is further desired that a step (E1) is carried out prior to step (F):

(E1) applying a force F5 to the elastic zone above the line SL such that the curvature is not reversed during steps (F) and (G) and is maintained after step (I).

Thus, to that end, the direction of force F5 is desired to reinforce the curvature. Therefore, it is desired that F5 points from S1 to S2 if the curvature exhibits a depression (dip) from PR1 to PR2 when viewed from the surface of S1, and vice versa. In certain embodiments, the step (E1) can be carried out during steps (F), (G) and (H), i.e., during the tensioning, scoring, bending and separation of the glass ribbon. Force F5 can be applied according to one of the following approaches, e.g.:

(F5a) maintaining a higher air pressure on the side of S2 than on the side of S1;

(F5b) blowing a gas stream against part of CR2 of S2 such that S2 is pushed toward S1;

(F5c) pushing S2 toward S1 by a pin in contact with CR2; and (F5d) a combination of at least two of (F5a), (F5b) and (F5c).

If approach (F5b) is chosen to effect force F5, in certain embodiments, the contact area in CR2 of the gas stream can be chosen to be within 50 cm above the score-line, in certain embodiments within 40 cm above the score-line, in certain other embodiments within 30 cm above the score-line, in certain other embodiments within 20 cm above the score-line. In general, a short distance between the primary area to which F5 is applied and the score-line allows for a small amount of F5 to achieve the shape-preserving effect. Thus, in these embodiments, force F5 can be less than 20 newton, in certain embodiments less than 10 newton, in certain embodiments less than 5 newton.

In certain embodiments of the process of the present invention, step (G) precedes step (F), i.e., edge restrainers ER1 and ER2 do not apply a tensioning force to the peripheral regions of the glass ribbon during the scoring step. Such embodiments can be advantageously adopted where the glass ribbon has a relatively small width, such as a width of smaller than 2000 mm where the glass ribbon in general exhibits a relatively high stiffness, or where the glass ribbon before steps (B), (C), (D) and (E) is substantially planar and does not exhibit a curvature from one side to the other. However, in certain embodiments, it is highly advantageous that step (F) is carried out prior to step (G), such that the glass ribbon is stabilized by the tension forces F1 and F2 above the score-line during the step of scoring. It should be noted that, even though the edge restrainers ER1 and ER2 provide some edge restraining function without tensioning forces F1 and F2 intentionally applied, the application of F1 and F2 can function to further stiffen the glass ribbon, and to conform the glass ribbon to the nosing bar NB which can be flat.

During step (G), a nosing bar NB may be used to support the area in the vicinity of the score-line SL on surface S2 so that a mechanical score-wheel can press surface S1 along the score-line SL, scribe the surface S1 to form a continuous scratch SL extending from PR1 to PR2. As mentioned supra, it is desired in certain embodiments that SL is substantially horizontal and perpendicular to the gravity vector, even though a slant score-line having a non-zero angle to the gravity vector may be also acceptable in other embodiments. The nosing bar NB supports the glass ribbon and prevents the glass ribbon from moving when a mechanical wheel presses down on surface S1. Detailed description of nosing bar material, shape, location, and operation, and the score-wheel location, material and operation can be found in, e.g., WO08/140,677 and WO08/140,678.

Thus, in certain embodiments, the nosing bar NB comprises a substantially flat piece of material extending from PR3 and PR4 contacting S2. When viewed from S1 in a direction perpendicular to S1, the score-line SL thus may fall within or slightly above or below the nosing bar NB area. Because the glass ribbon separates the nosing bar NB and the score-line SL, the nosing bar area is considered to be in the vicinity of the score-line SL in all three scenarios. It is believed that where the nosing bar NB area covers the score-line SL, the glass ribbon is more stable due to the direct support provided.

In certain embodiments, during step (H), when the glass ribbon is bent and separated, the nosing bar remains in direct contact with surface S2 of the glass ribbon. In these embodiments, the nosing bar NB provides at least part of the support force F4, which, in combination with F3, generates the bending moment required for the glass ribbon to bend and separate.

After the separation of the glass sheet from the glass ribbon at the end of step (H), the edge restrainers ER1 and ER2 are released from the glass ribbon in step (I). Where a nosing bar NB contacts S2 in step (H), it is desired that the nosing bar NB is released from S2 during or after step (I).

Figure 4:
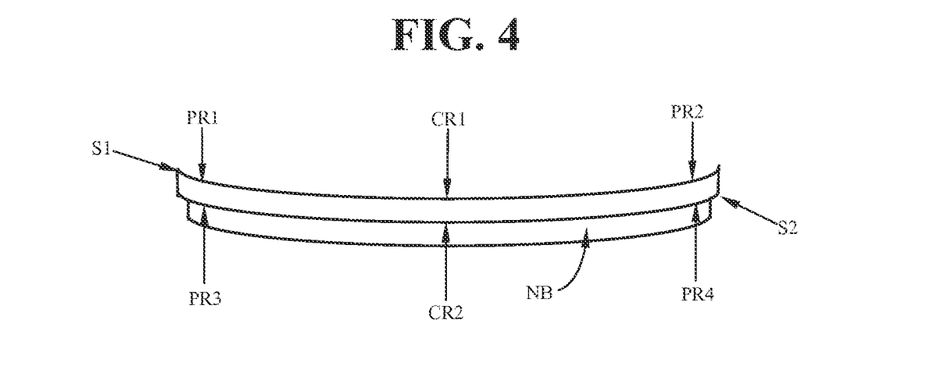
FIG. 4 is a schematic drawing showing the cross-section of a glass ribbon operating according to an embodiment of the process of the present invention, where a conformable nosing is utilized.
Figure 5:
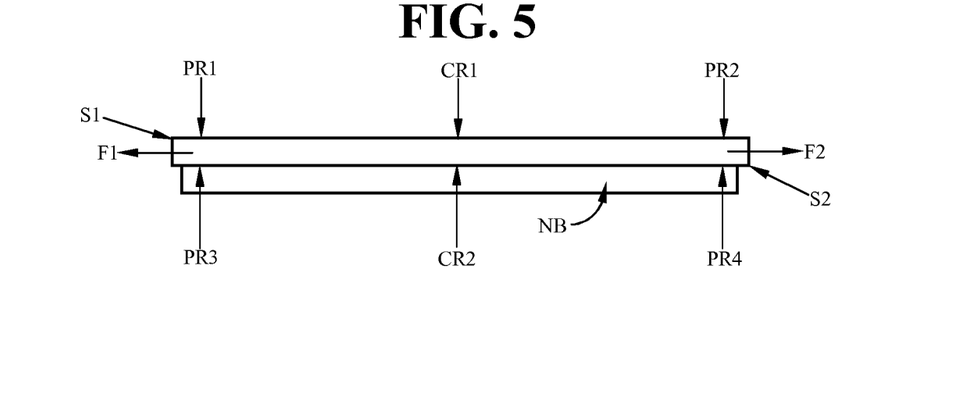
FIG. 5 is a schematic drawing showing the cross-section of a glass ribbon operating according to an embodiment of the process of the present invention, where a flat nosing is utilized.

As mentioned supra and illustrated in FIG. 5, in certain embodiments, the nosing bar NB contacting surfaces S2 can be flat. In these embodiments, it is desired that prior to step (G) where the surface S1 is scored, step (F) is carried out such that the glass ribbon is flattened by the tensioning forces F1 and F2 to conform to the flat nosing bar. In certain other embodiments, it is highly advantageous to use a curved nosing bar NB shown in FIG. 4 that can be adjusted to conform to the curvature of S2 and/or S1 without substantially altering the curvature of S2. The conformable nosing may be configured to contact only S2, or both S1 and S2. Details of such conformable nosing including material choice, structures and operation are provided in WO08/140,677 and WO08/140,678, the contents of both of which are incorporated herein by reference in their entirety. In such embodiments utilizing a conformable nosing, it is highly advantageous that step (F) is not carried out prior to step (G), such that the tensioning forces F1 and F2 are not applied to alter the surface curvature of the glass ribbon. In these embodiments, step (F) is advantageously carried out after step (G) but prior to step (H), such that during bending and separation, the glass ribbon is further stabilized and tensioned by the edge restrainers ER1 and ER2. Further, it is advantageous in certain embodiments to adjust the nosing curvature in step (H) such that the nosing is substantially flat to facilitate the bending and separation of the glass ribbon. Still further, in those embodiments, it is advantageous to adjust the nosing curvature after step (H) but before step (I) to conform to the curvature of S2 before step (G) is carried out so that when ER1 and ER2 is released from the glass ribbon, the curvature of the glass ribbon can restore to its natural shape when no external tensioning or compressing by the edge restrainers and the nosing bar exists.

The edge restrainers of the present invention can take various forms. For example, each of ER1 and ER2 can be a suction cup, a clamp or a pair of rollers. The materials directly contacting surface S1 and/or S2, either of a suction cup or a clamp or roller pairs, can be advantageously made of high-temperature polymer materials, such as silicone rubbers, polytetrafluoroethylene, and the like. The edge restrainers establish an intimate contact with the peripheral regions of S1 and/or S2, can travel downward with a velocity substantially equal to V1, and can exert tensioning and/or compressing forces in desired amount to the glass ribbons via the surface contact. One skilled in the art of glass sheet handling can design and choose the proper material, size, structure, and actuating devices of the suction cups, clamps and edge rollers according to the size, velocity, thickness, temperature, and other parameters of the glass ribbon being handled.

In certain embodiments, the edge restrainers ER1 and ER2 contact only S1 and do not contact S2 during steps (F), (G) and (H). In certain embodiments, the edge restrainers ER1 and ER2 contact only S2 and do not contact S1 during steps (F), (G) and (H). In other embodiments, the edge restrainers ER1 and ER2 contact both S1 and S2 during steps (F), (G) and (H). In certain embodiments, the edge restrainers ER3 and ER4 contact only S1 and do not contact S2 during steps (F), (G) and (H). In other embodiments, the edge restrainers ER3 and ER4 contact only S2 and do not contact S1 during steps (F), (G) and (H). In other embodiments, the edge restrainers ER3 and ER4 contact both S1 and S2 during steps (F), (G) and (H). Where clamps are used as the edge restrainers, they typically contact both S1 and S2 to provide the needed restraining, tensioning and compressing functions. Where suction cups are used as the edge restrainers, choices can be made to contact either or both sides of S1 and S2.

As is clear from the description supra, while only one edge restrainer ER1 and ER2 is shown in each peripheral region PR1 and PR2 of the glass ribbon in FIGS. 1, 2 and 3, multiple edge restrainers ER1 and ER2 may be used to contact the ribbon surface S1 and/or S2 simultaneously or sequentially. For example, in each peripheral region PR1 or PR2, 2, 3 or even more edge restrainers ER1 and ER2 may be used to collectively provide the edge restraining, guiding and tensioning functions. The multiple edge restrainers ER1 contacting PR1 may be termed ER1(1), ER1(2), . . . , ER1($n$), and the multiple edge restrainers ER2 contacting PR2 may be termed ER2(1), ER2(2), . . . , ER2($n$), and the like. The locations of ER1(1), ER1(2), . . . , ER1($n$) may form a horizontal or vertical line, a triangle pattern, a square pattern, a circular pattern, and the like. Similarly, the locations of ER2(1), ER2(2), . . . , ER2(n) may form a horizontal or vertical line, a triangle pattern, a square pattern, a circular pattern, and the like. Nonetheless, it is desired in certain embodiments that the pattern formed by the locations of ER1(1), ER1(2), . . . , ER1(n) and the pattern formed by the locations of ER2(1), ER2(2), . . . , ER2(n) are symmetrical with respect to the centerline CL1 of S1. Further, the operation of the ER1(1), ER1(2), . . . , ER1(n) and ER2(1), ER2(2), . . . , ER2(n) are advantageously synchronized and symmetrical with respect to the centerline CL1. With the use of a common platform such as a traveling anvil machine, such synchronization and symmetry can be relatively easy to achieve.

Similarly, as is clear from the description supra, while only one edge restrainer ER3 and ER4 is shown in each peripheral region PR1 and PR2 of the glass ribbon in FIGS. 1, 2 and 3, multiple edge restrainers ER3 and ER4 may be used to contact the ribbon surface S1 and/or S2 simultaneously or sequentially. For example, in each peripheral region PR1 or PR2, 2, 3 or even more edge restrainers ER3 and ER4 may be used to collectively provide the edge restraining, guiding and tensioning functions. The multiple edge restrainers ER3 and ER4 contacting PR1 may be termed ER3(1), ER3(2), . . . , ER3(n), and the multiple edge restrainers ER4 contacting PR2 may be termed ER4(1), ER4(2), . . . , ER4(n), and the like. The locations of ER3(1), ER3(2), . . . , ER3(n) may form a horizontal or vertical line, a triangle pattern, a square pattern, a circular pattern, and the like. Similarly, the locations of ER4(1), ER4(2), . . . , ER4(n) may form a horizontal or vertical line, a triangle pattern, a square pattern, a circular pattern, and the like. Nonetheless, it is desired in certain embodiments that the pattern formed by the locations of ER3(1), ER3(2), . . . , ER3(n) and the pattern formed by the locations of ER4(1), ER4(2), . . . , ER4(n) are symmetrical with respect to the centerline CL1 of S1. Further, the operation of the ER3(1), ER3(2), . . . , ER3(n) and ER4(1), ER4(2), . . . , ER4(n) are advantageously synchronized and symmetrical with respect to the centerline CL1. With the use of a common platform such as a robot tooling, such synchronization and symmetry can be relatively easy to achieve.

In certain embodiments, in order to synchronize the operation of the edge restrainers ER1 and ER2, they may be installed on a unitary platform extending from one peripheral region to the other of the glass ribbon capable of traveling at a velocity substantially equal to V1 of the glass ribbon during operation. In certain embodiments, the platform is advantageously capable of reciprocal vertical motions such that steps (B)-(I) can be repeated in multiple restraining, scoring, bending and separation operations. Furthermore, in certain embodiments, it is desired that the edge restrainers ER1, ER2, the nosing bar, and the scoring assembly are all installed on a unitary platform capable of reciprocal vertical motions allowing repeated operations. Such platform is sometimes called traveling anvil machine (TAM) because it provides the anvil function during scoring, bending and separation steps. Detailed description of a TAM is provided in, e.g., U.S. Pat. No. 6,616,025 and WO08/133,800, the contents of both of which are incorporated herein by reference in their entirety.

The edge restrainers ER3 and ER4 are advantageously part of the robot tooling for handling glass sheets at the BOD area of a vertical down-draw process. ER3 and ER4 can provide the required breaking force F3, in combination or solely, that bends and breaks the glass ribbon along the score-line. At the end of step (H) and in step (I), ER3 and ER4 may carry the separated glass sheets to a downstream location or mechanism, such as a crate, a conveyer belt, a transporting platform, and the like. Description of a robot tooling is provided in, e.g., U.S. Pat. No. 6,616,025, the content of which is incorporated herein by reference in its entirety.

As mentioned supra, the process of the present invention is particularly advantageous for a glass-making process, such as a fusion down-draw, slot-draw or re-draw process, where the precursor glass ribbon comprises, in addition to the elastic zone which is to be scored, bent and separated, a visco-elastic zone directly connected with the elastic zone that can be negatively affected by motion in the elastic zone. The visco-elastic zone may travel at a vertical velocity V1' that is substantially equal to V1 or slightly lower than V1 due to possible thinning in this zone. In certain embodiments, the visco-elastic zone is within 10 meters above the score-line, in certain embodiments within 5 meters, in other embodiments within 3 meters, in other embodiments within 2 meters, in other embodiments within 1 meter, in other embodiments within 0.5 meter.

As mentioned supra, the process of the present invention is particularly advantageous for a glass-making process, such as a fusion down-draw, slot-draw or re-draw process, where the precursor glass ribbon comprises, in addition to the elastic zone which is to be scored, bent and separated, a visco-elastic zone directly connected with and above the elastic zone, as well as a viscous zone directly connected with and above the visco-elastic zone, that can be negatively affected by motion in the elastic zone. In certain embodiments, the viscous zone is within 12 meters above the score-line, in certain embodiments within 10 meters, in certain embodiments within 8 meters, in certain embodiments within 5 meters, in other embodiments within 3 meters.

As discussed supra, the process of the present invention is particularly advantageous for a process for making a glass sheet having a precursor ribbon having a high flexibility (low stiffness) defined by the ratio W1/T1. In particular, the process of the present invention is particularly advantageous for making a glass sheet having a W1/T1 ratio of at least 1000, in certain embodiments at least 2000, in certain other embodiments at least 3000, in certain other embodiments at least 5000, in certain other embodiments at least 6000, in certain other embodiments at least 7000, in certain other embodiments at least 8000, in certain other embodiments at least 9000, in certain embodiments at least 10000. The edge restrainers ER1 and ER2, simple as they appear, provide significant stability improvement to the manufacture process and product attribute consistency, especially thickness variation, stress and stress distribution for glass sheets having a high W1/T1 ratio.

In particular, the present invention process is particularly advantageous for making glass sheets having a thickness T1 of at most 1.0 mm, in certain embodiments at most 0.8 mm, in certain embodiments at most 0.7 mm, in certain other embodiments at most 0.6 mm, in certain embodiments at most 0.4 mm, in certain other embodiments at most 0.3 mm.

In step (G), the score-line on surface S1 may be formed by mechanical scoring using a mechanical scoring wheel detailed in WO08/133,800, the content of which is incorporated herein by reference in its entirety. Alternatively, laser scoring described in, e.g., WO08/140,818, WO09/045,319, WO09/067,164, and WO09/091,510, the contents of which are incorporated herein by reference in its entirety, may be used to make the score-line as well. The combination of laser scoring and the use of edge restrainer would be especially advantageous for making glass sheets having low stiffness, such as those having a large width and/or a low thickness described above.

As mentioned above, in a continuous glass manufacture process, the precursor glass ribbon provided in step (A) is usually continuous, and the glass ribbon needs to be scored and separated repeatedly to make multiple glass sheet products. In such a continuous glass sheet making process such as one using the fusion down-draw glass forming technology, steps (B), (C), (D), (E), (F), (G), (H) and (I) can be repeated, especially where a TAM having reciprocal vertical motion capability is used, so that multiple glass sheets can be made continuously with consistent quality and significant process stability. Robot tooling can be programmed to repeatedly engage the edge restrainers ER3, ER4 with the glass ribbon surface, bending the glass ribbon, transport the separated glass sheet to a downstream device, release the glass sheet from the edge restrainers ER3 and ER4, and then return to the predetermined position to engage the glass ribbon to be separated in the next cycle.

Thus, examples of step (A) can comprise the following steps:

(A1) providing a glass melt;

(A2) forming a continuous glass ribbon from the glass melt by a fusion down-draw or slot down-draw process; and (A3) cooling the continuous glass ribbon to form the precursor glass ribbon.

The fusion down-draw process is described in detail, e.g., in WO03/014032, WO05/081888, the contents of which are incorporated herein by reference in their entirety.

A second aspect of the present invention is an apparatus for making a target elastic glass sheet from a continuously moving precursor glass ribbon comprising an elastic portion having a first major surface S1, a second major surface S2 opposing S1, S1 comprising a first peripheral region PR1, a second peripheral region PR2, and a first center region CR1, S2 comprising a third peripheral region PR3 opposing PR1, a fourth peripheral region PR4 opposing PR2, and a second center region CR2 opposing CR1, comprising:

(I) at least one pair of rotatable edge rollers having substantially stationery axles relative to the earth capable of engaging PR1, PR3, PR2 and PR4 to provide a substantially constant downward velocity V1 parallel to the gravity vector to the precursor glass ribbon;

(II) a scoring device capable of providing a substantially horizontal score-line on the surface S1;

(III) a nosing adapted for: (a) contacting and engaging S2 to stabilize the precursor glass ribbon; (b) traveling at a velocity substantially equal to V1; and (c) providing a supporting force F4 perpendicular to S1 during bending of the precursor glass ribbon pointing from S2 to S1;

(IV) a first edge restrainer ER1 adapted for: (a) contacting at least one of PR1 and PR3 above the score-line; (b) traveling at a velocity substantially equal to V1; and (c) providing a tensioning force F1 to the elastic portion perpendicular to the velocity V1;

(V) a second edge restrainer ER2 adapted for: (a) contacting at least one of PR2 and PR4 above the score-line; (b) traveling at a velocity substantially equal to V1; and (c) providing a tensioning force F2 to the elastic portion perpendicular to the velocity V1 having a direction opposite to F1;

(VI) a third edge restrainer ER3 adapted for: (a) contacting at least one of PR1 and PR3 below the score-line; (b) traveling at a velocity substantially equal to V1; and (c) providing at least part of a bending force F3 to the elastic portion in a direction perpendicular to S1 and opposite to F4; and (VII) a fourth edge restrainer ER4 adapted for: (a) contacting at least one of PR2 and PR4 below the score-line; (b) traveling at a velocity substantially equal to V1; and (c) providing at least part of the bending force F3.

Various components of the apparatus of the present invention has been described supra. For example, in certain particularly advantageous embodiments, ER1, ER2 and the nosing are all mounted on a single platform (such as a traveling anvil machine) adapted for traveling at a velocity substantially equal to V1. Likewise, in certain particularly advantageous embodiments, ER3 and ER4 are mounted on a robot tooling, as described supra.

In certain embodiments of the apparatus of the present invention, The apparatus further comprises:

(VIII) a gas nozzle adapted for blowing a gas stream toward CR2 to provide a force F5 to the precursor glass ribbon having a direction pointing from S1 to S2.

The temperature and flow rate of the gas provided by the nozzle can be determined according to the needs of specific sheet-making process based on factors such as sheet width, sheet thickness, sheet material composition, sheet surface curvature, and the like.

In certain embodiments of the apparatus of the present invention, ER1, ER2, ER3 and ER4 are either suction cups or clamps. In certain embodiments, ER1, ER2, ER3 and ER4 comprise actuators, valves and other control mechanisms that can be used to adjust the location, vacuum exerted, clamping force, tensioning force, compressing force, engaging, disengaging, and the like, of the suction cups and/or clamps as needed.

In certain embodiments, it is recommended that edge restrainers ER1 and ER2 are 70 mm to 150 mm measured from the score-line. Lab test data suggests wider range could be used, e.g., 50 mm to 200 mm. Equipment space constraints can be another determining factor. In certain embodiments, to save space, suction cups ER1 and ER2 are horizontally aligned with robot tooling suction cups ER3 and ER4. They need to be able to accommodate sheet walk as robot tooling. Cup arrangement can be vertical, horizontal or triangular with 2 to 3 on each side of restrainer unit to deliver sufficient load carrying capacity (no slippage and long suction cup life). Suction cups can engage the ribbon from either S1 and/or S2 sides. In certain embodiments, it is highly desired that ER3 and ER4 at least engage S1, as during step (H), when the glass ribbon is bent and separated, the ribbon will push instead of pull ER3 and ER4, resulting in a more stable process. Tensioning forces F1 and F2 can range from 0 to 50 pound (0 to 222 newton) in certain embodiments, depending from factors such as sheet size, sheet thickness and the like. In certain advantageous embodiments, the edge restrainers ER1 and ER2 have all the position alignment capabilities as current robot tooling. If plastic materials are used to make ER1 and ER2, ER1 and ER2 may be thermally shielded from hotter upstream components. In certain embodiments, ER1 and ER2 are placed on articulating arms, such that during certain events, such as upstream catastrophic sheet breakage, ER1 and ER2 can be moved away from the path of the falling glass pieces.

Figure 7:
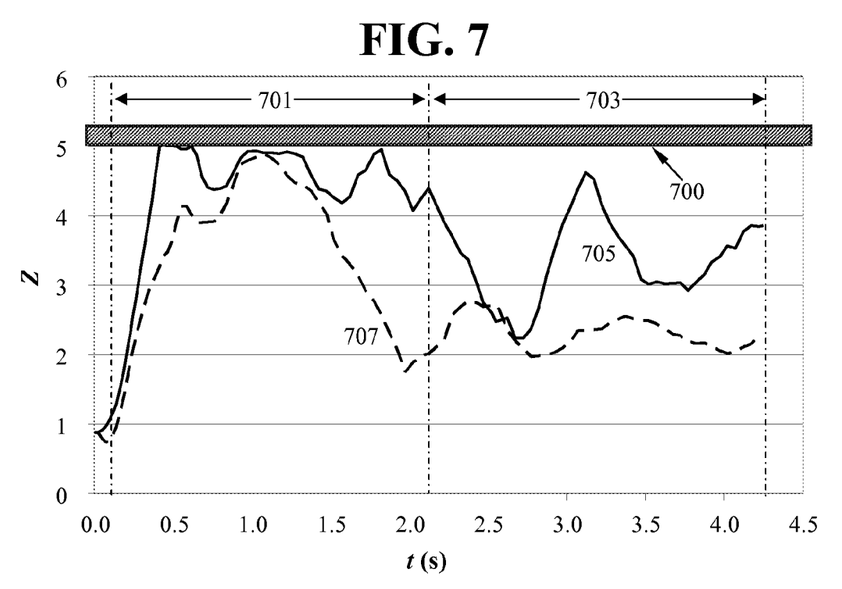
FIG. 7 is a diagram showing the impact of scoring on sheet curvature over a period of time during and after scoring with and without the use of edge restrainers of the present invention.

FIG. 7 shows the impact on ribbon motion reduction and glass ribbon curvature reinforcement by using the edge restrainers according to one embodiment of the present invention based on dynamic process simulation. In this figure, the horizontal axis is time in second, the vertical axis shows the distance between a glass surface in the vicinity of the score-line and a sensor having a fixed position, 700 stands for a flat nosing bar, the range 701 represents the scoring period, the range 703 represents a period after scoring when the score wheel does not contact the glass surface, the solid-line curve 705 represents an embodiment where the glass ribbon is not restrained by edge restrainers according to the present invention, and the dotted-line curve 707 represents an embodiment where the glass ribbon is restrained by edge restrainers according to the present invention. In the embodiment where edge restrainers according to the present invention are used, ribbon motion is significantly reduced and bow shape reinforced (fewer propensities for bow pop).

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A process for making a target glass sheet, comprising the following steps:
   (A) providing a precursor glass ribbon comprising an elastic portion, the elastic portion having a thickness (T1), a width (W1), a first major surface (S1) having a target point (TP) traveling with a velocity (V1) parallel to the gravity vector, a second major surface (S2) opposing (S1), (S1) comprising a first peripheral region (PR1), a second peripheral region (PR2) and a first center region (CR1); (S2) comprising a third peripheral region (PR3), a fourth peripheral region (PR4) and a second center region (CR2), where (PR1) is in opposing relation to (PR3), (PR2) is in opposing relation to (PR4), and (CR1) is in opposing relation to (CR2);
   (B) contacting a first edge restrainer (ER1) traveling with a downward velocity substantially equal to (V1) with at least one of (PR1), and (PR3) at a first restrainer location above a horizontal line (SL) passing through the point (TP);
   (C) contacting a second edge restrainer (ER2) traveling with a downward velocity substantially equal to (V1) with at least one of (PR2) and (PR4) at a second restrainer location above the line (SL);
   (D) contacting a third edge restrainer (ER3) with at least one of (PR1) and (PR3) at a third restrainer location below the line (SL);
   (E) contacting a fourth edge restrainer (ER4) traveling with a downward velocity substantially equal to (V1) with at least one of (PR2) and (PR4) at a fourth restrainer location below the line (SL);
   (F) applying a first tensioning force (F1) perpendicular to (V1) and in one direction of the width (W1) to the elastic portion by the first edge restrainer, and applying a second tensioning force (F2) opposite to (F1) to the elastic portion by the second edge restrainer;
   (G) forming a transverse score-line along the line (SL) on (S1) below the locations of the first edge restrainer and the second edge restrainer;
   (H) applying to the elastic portion a breaking force (F3) perpendicular to the elastic portion below the score-line and a supporting force (F4) above the score-line in a direction opposite to that of (F3), the direction of (F3) being pointing from (S1) to (S2), thereby breaking the elastic portion along the score-line to obtain the target glass sheet below the score-line; and
   (I) releasing (ER1) and (ER2) from the elastic portion after step (H).

2. A process in accordance with claim 1, further comprising a step (H1) after step (H) but before step (I):
   (H1) reducing (F1) and (F2) continuously to substantially zero.

3. A process in accordance with claim 1, wherein prior to steps (B), (C), (D), (E) and (F), (S2) above the line (SL) exhibits a curvature from (PR1) to (PR2).

4. A process in accordance with claim 3, further comprising the following step (E1) before step (E):
   (E1) applying a force (F5) to the elastic zone above the line (SL) such that the curvature is not reversed during steps (F) and (G) and is maintained after step (I).

5. A process in accordance with claim 1, wherein steps (F) precedes step (G).

6. A process in accordance with claim 5, wherein a nosing contacts (S2) in the vicinity of the score-line during step (G).

7. A process in accordance with claim 6, wherein the nosing maintains contact with (S2) during step (H).

8. A process in accordance with claim 6, wherein during step (G), the nosing contacts (S2) the vicinity of the score-line, and the nosing is adjusted to conform to the curvature of (S2) without substantially deforming the curvature of (S2).

9. A process in accordance with claim 1, wherein (ER1) and (ER2) are selected from suction cups, clamps and rollers.

10. A process in accordance with claim 1, wherein (ER1), (ER2), (ER3) and (ER4) contact (S2) and do not contact (S1) during steps (F), (C) and (H).

11. A process in accordance with claim 6, wherein (ER1), (ER2) and the nosing are fixed on a platform capable of reciprocal vertical motion.

12. A process in accordance with claim 1, wherein the precursor glass ribbon further comprises a visco-elastic zone traveling with a velocity (V1') within 10 meters above the score-line, where (V1') is parallel to (V1).

13. A process in accordance with claim 1, wherein the precursor glass ribbon further comprises a viscous zone within 12 meters of the score-line.

14. A process in accordance with claim 1, wherein the ratio (W1)/(T1) of the elastic zone is at least 1000.

* * * * *

UNITED STATES PATENT AND TRADEMARK OFFICE
CERTIFICATE OF CORRECTION

PATENT NO.         : 9,027,815 B2
APPLICATION NO.    : 12/942124
DATED              : May 12, 2015
INVENTOR(S)        : Gautam Narendra Kudva et al.

Page 1 of 1

It is certified that error appears in the above-identified patent and that said Letters Patent is hereby corrected as shown below:

Claims

| No. | Col. | Line | | Description |
|-----|------|------|---|-------------|
| 1 | 21 | 38 | Claim 1 | Letter number appears as "(B)" but SHOULD BE: "(E)" |
| 2 | 22 | 36 | Claim 10 | Appears as: "during steps (F), (C), and (H)" SHOULD BE: "during steps (F), (G), and (H)" |

Signed and Sealed this
Twenty-fourth Day of November, 2015

Michelle K. Lee
*Director of the United States Patent and Trademark Office*